US012745068B2

(12) United States Patent
Singh et al.

(10) Patent No.: US 12,745,068 B2
(45) Date of Patent: Sep. 22, 2026

(54) ELECTRONIC MONITORING SYSTEM INCLUDING LOW ENERGY BUTTON FOR REMOTE ACTIVATION AND CONTROL OF DEVICES

(71) Applicant: Arlo Technologies, Inc., Carlsbad, CA (US)

(72) Inventors: Rajinder Singh, San Jose, CA (US); Timothy Johnston, Los Gatos, CA (US)

(73) Assignee: Arlo Technologies, Inc, Carlsbad, CA (US)

( * ) Notice: Subject to any disclaimer, the term of this patent is extended or adjusted under 35 U.S.C. 154(b) by 345 days.

(21) Appl. No.: 18/409,069

(22) Filed: Jan. 10, 2024

(65) Prior Publication Data

US 2025/0227449 A1 Jul. 10, 2025

(51) Int. Cl.
*H04W 4/02* (2018.01)
*H04W 4/90* (2018.01)

(52) U.S. Cl.
CPC ............... *H04W 4/90* (2018.02); *H04W 4/02* (2013.01)

(58) Field of Classification Search
None
See application file for complete search history.

(56) References Cited

U.S. PATENT DOCUMENTS 10,281,986 B2 5/2019 Howard et al.
2010/0238111 A1 9/2010 Chen et al.
2015/0043676 A1* 2/2015 Zhang ................ H04L 27/2607 375/295

FOREIGN PATENT DOCUMENTS

CN 105183173 B 12/2015

OTHER PUBLICATIONS

European Patent Office Search Report for Application No. 24223631.3 dated Mar. 13, 2025 (25 pages).

* cited by examiner

*Primary Examiner* — John F Mortell
(74) *Attorney, Agent, or Firm* — Boyle Fredrickson, S.C.

(57) ABSTRACT

An electronic monitoring system and a method of activating devices in the electronic monitoring system are provided. The electronic monitoring system includes a communication device having an actuator which generates a signal when the actuator is selectively engaged and a transmitter to transmit data corresponding to the signal when the actuator is selectively engaged. A receiver is in communication with the transmitter to receive the data from the transmitter, and a controller is in communication with the receiver to receive the data from the receiver. The controller is operative to detect at least one short duration signal and at least one long duration signal from the data, detect a pattern from the at least one short duration signal and the at least one long duration signal, and execute a task in the electronic monitoring system as a function of the pattern detected.

18 Claims, 4 Drawing Sheets

ELECTRONIC MONITORING SYSTEM INCLUDING LOW ENERGY BUTTON FOR REMOTE ACTIVATION AND CONTROL OF DEVICES

FIELD OF THE INVENTION

This invention relates generally to peripheral devices for electronic monitoring systems, and in particular, to an electronic monitoring system including a low energy button that allows users to remotely activate and control devices connected to the electronic monitoring system.

BACKGROUND OF THE INVENTION

The Internet is a global system of interconnected computers and computer networks that communicate with each other. The Internet of Things (IoT) applies this concept to a network of linked everyday objects which can communicate, be read, recognized, located, and controlled via the internet or other communication networks.

The number and variety of IoT devices continues to grow. In the area of automation of homes and buildings, smart homes and buildings may have centralized control over nearly any device or system in the home or office, from appliances to home and business security systems. In the field of asset tracking, commercial businesses, hospitals, factories, and large organizations can utilize IoT devices to track the locations of various assets such as equipment, patients, products, vehicles, etc. In the area of health and wellness, doctors can remotely monitor patients' health, and laypeople can track the progress of fitness routines. In the area of personal safety, individuals can track their own location or the location of others, receive location-based notifications, and request security intervention or emergency services through the use of low energy peripheral devices such as portable Bluetooth® Low Energy (BLE) buttons communicating using short range wireless communication protocols usable over a Personal Area Network (referred to herein as "personal area network communications" or "PAN communications). These communications most typically are Bluetooth®, but sometimes take the form of other communications such as Zigbee®, Z-Wave™, and MQTT™. For the sake of conciseness, the term "PAN communications protocol" will be understood to include Bluetooth®, Zigbee®, Z-Wave™, MQTT™, and other communications protocols operable in a short range in a PAN. Devices communicating via such a PAN communications protocol will be referred to herein as a "BLE" device.

Traditional electronic monitoring systems include various devices configured to capture, store and transmit visual images and/or audio of a monitored area within the environment. In addition, these systems may include one or more sensors that are configured to detect one or more types of conditions or stimulus, microphones, sound sensors, lights, and speakers configured for audio communication or providing audible alerts. The various components of the electronic monitoring system interact with a cloud-based back-end system or control service that controls functions or provides various processing tasks for the components of the system. In addition, a user device, such as a PC or desktop computer, or a mobile device, such as a smart phone, a tablet or the like, may be used by a user to configure or communicate with the various components of the electronic monitoring system and the control service.

In order to set up an electronic monitoring system, a user establishes an account with a service provider through the service provider's webpage or using the service provider's application on a user device. In the account, the user adds or onboards the various components of the electronic monitoring system associated with the user's account by utilizing, for example, a pre-populated list of devices and simply following a series of on-screen instructions. The process ensures that only the owner of the account has access to the various components and data associated with the account.

The user may install an application from the service provider on a mobile device, such as a smart phone or tablet, to provide an interface to the electronic monitoring system. The application may allow the user to control various components of the electronic monitoring system using the mobile device. The user may, for example, turn on lights, lock or unlock a door, and/or activate or deactivate a siren in the monitoring system. These control options, however, are only available to a user when the user has access to the mobile device.

In some cases, a user may not have the mobile device readily available. The mobile device may be in a bag, in a vehicle, or otherwise not readily accessible. The user must first retrieve the mobile device and then proceed to perform a desired control function. When the user has completed the desired control function, the mobile device may need to be returned to its prior location.

In contrast, the BLE device, discussed above, is typically carried with a user and is typically readily accessible. Since the intended purpose of the BLE device is to request security intervention or emergency services if required, the BLE device is carried by the user in a manner such that it is readily accessible.

Therefore, it would be desirable to provide a system and method for using the BLE device to allow a user to control other devices within the electronic monitoring system.

SUMMARY OF THE INVENTION

In accordance with one embodiment of the present invention, an electronic monitoring system includes a communication device, a receiver, and a controller. The communication device includes an actuator which generates a signal when the actuator is selectively engaged and a transmitter to transmit data corresponding to the signal when the actuator is selectively engaged. The receiver is in communication with the transmitter to receive the data from the transmitter, and the controller is in communication with the receiver to receive the data from the receiver. The controller is operative to detect at least one short duration signal and at least one long duration signal from the data, detect a pattern from the at least one short duration signal and the at least one long duration signal, and execute a task in the electronic monitoring system, selected from a plurality of tasks, as a function of the pattern detected.

According to another aspect of the invention, the electronic monitoring system includes a hub and multiple devices in communication with the hub, and the receiver and the controller may be located in the hub. The task executed by the controller controls operation of at least one of the of devices.

According to still other aspects of the invention, the communication device includes a control circuit connected to the actuator to receive the signal from the actuator. The control circuit monitors a duration of the signal each time the actuator is selectively engaged and identifies whether the duration of the signal during each selective engagement is a short duration signal or a long duration signal. The control circuit inserts a sequence of short duration signals and long duration signals into the data for the transmitter.

According to yet another aspect of the invention, the electronic monitoring system may include a mobile device, and the receiver and the controller may be in the mobile device. The mobile device is in communication with the hub, and the task executed by the mobile device is transmitting the pattern received from the communication device to the hub. The hub controls operation of at least one of the devices in the electronic monitoring system responsive to receiving the pattern. The mobile device is in communication with the communication device via a personal area network, and the mobile device is in communication with the hub via a wide area network. The mobile device includes global positioning data, and the mobile device transmits the global positioning data along with the pattern to the hub.

In accordance with another embodiment of the invention, a method of initiating a task in an electronic monitoring system includes generating a signal with a communication device responsive to an actuator on the communication device being selectively engaged. Data from the communication device is received at a controller, where the data corresponds to the signal from the communication device. At least one short duration signal and at least one long duration signal is detected from the data. A pattern is detected from the at least one short duration signal and the at least one long duration signal, and a task, selected from a plurality of tasks, in the electronic monitoring system is executed as a function of the pattern detected.

According to another aspect of the invention, the data is received from the communication device at a mobile device via a personal area network. A present location of the mobile device and of the communication device is determined as a function of position data for the mobile device. The data and the present location are transmitted from the mobile device to the controller. The controller executes a first task in the electronic monitoring system when the present location of the mobile device is in a first range of positions, and the controller executes a second task in the electronic monitoring system when the present location of the mobile device is in a second range of positions. Optionally, the mobile device may read a present time from a clock circuit. The controller may execute a first task in the electronic monitoring system when the present time is in a first range of times and execute a second task in the electronic monitoring system when the present time is in a second range of times.

In accordance with still another embodiment of the invention, a communication device for an electronic monitoring system includes a housing, an actuator mounted on the housing such that the actuator is selectively engaged from external to the housing, and a control circuit mounted within the housing. The control circuit is configured to receive a signal from the actuator when the actuator is selectively engaged, detect at least one short duration signal and at least one long duration signal from the signal, and generate a data packet for transmission from the communication device via a personal area network. The data packet is generated as a function of the at least one short duration signal and the at least one long duration signal. The communication device also includes a transmitter in communication with the control circuit to receive the data packet from the control circuit and to transmit the data packet via the personal area network. The control circuit may also be configured to detect a pattern from the at least one short duration signal and the at least one long duration signal, read an identifier for the pattern from a look up table stored in memory, and insert the identifier in the data packet for transmission via the personal area network.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRA WINGS

Preferred exemplary embodiments of the invention are illustrated in the accompanying drawings in which like reference numerals represent like parts throughout, and in which.

DETAILED DESCRIPTION OF THE DRAWINGS

Figure 1:
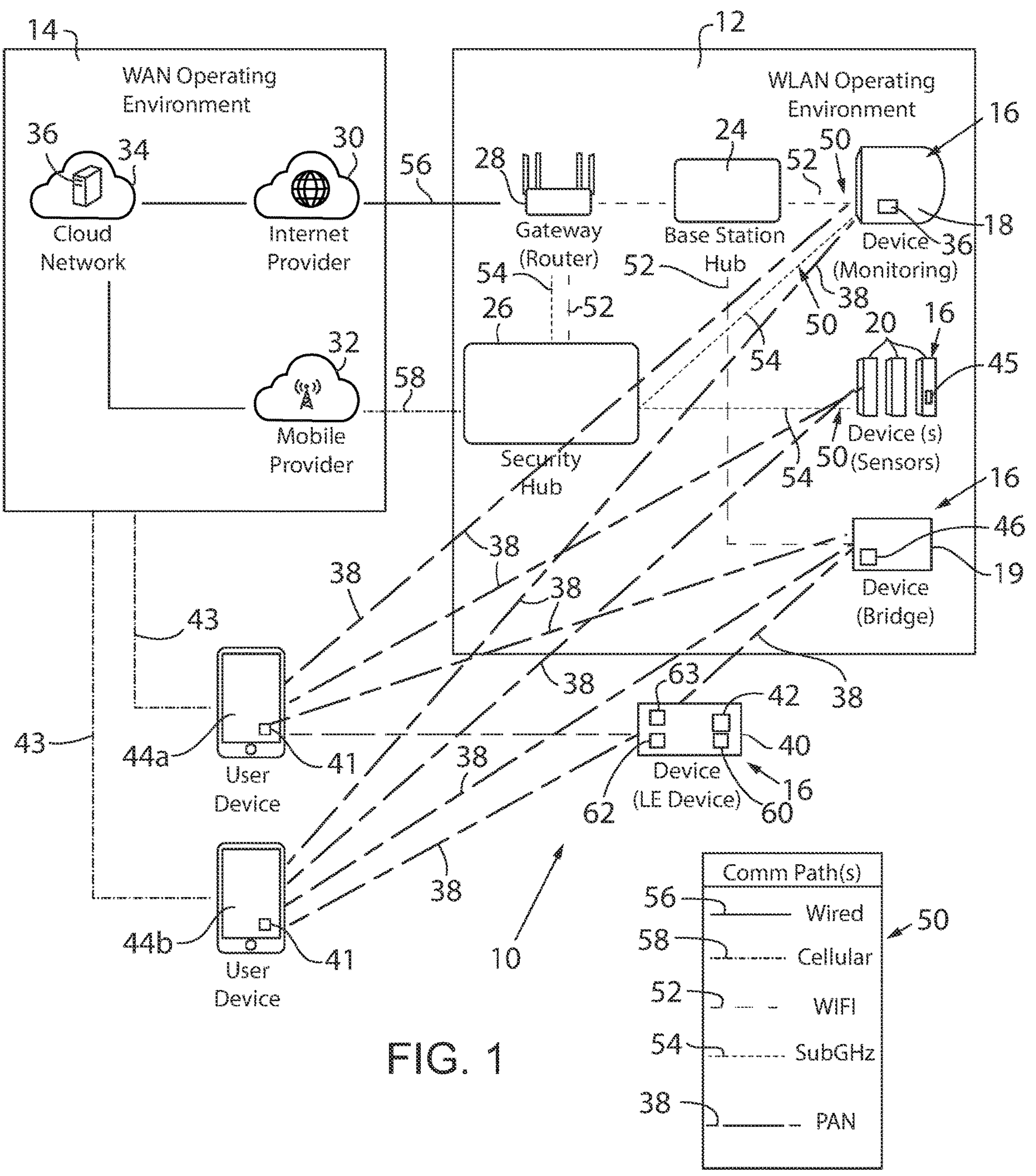
FIG. 1 is a block diagram of a system for electronic monitoring in accordance with one embodiment of the present invention.

Referring to FIG. 1, an electronic monitoring system 10 in accordance with an aspect of the present invention is generally shown. Electronic monitoring system 10 is implemented in a wireless communication operating environment. For example, wireless communication may be implemented by a WLAN (wireless local area network) operating environment (WLAN 12) or by communications technology on a personal area network (PAN) between the various components of electronic monitoring system 10 and/or one or more user devices 44, as hereinafter described. As mentioned above, communications may occur using Bluetooth® technology, but may also occur using Zigbee® or another short-range protocol. The term "PAN" should be understood to encompass all such communication technologies and protocols.

In the depicted embodiment, WLAN 12 is communicatively connected to a WAN (wide area network) operating environment, designated by the reference numeral 14. Within WLAN 12, various peripheral devices, also known as "client devices" 16, such as monitoring devices 18, bridges 19 and sensors 20, are wirelessly networked to a base station or high frequency hub 24 which, in turn, communicates with the WAN 14 via a gateway hub shown as gateway router 28. Base station hub 24 and router 28 provide a high frequency connection to WAN 14. Base station hub 24 may be eliminated as a stand-alone module if its functionality is incorporated into the gateway router 28, in which case the router 28 also serves as a base station hub. The system may also include a security hub 26 that communicates with monitoring device(s) 18 and with the WAN 14 and provides a low frequency connection between the WAN 14 and monitoring devices 18. If present, the security hub may also communicate with the router or hub 24, such as through a high frequency communication path 52 and/or a low frequency communication path 54 to the router 28. The security hub 26 is also provided with the capability of providing a high frequency connection with monitoring devices 18.

Still referring to FIG. 1, gateway router 28 is typically implemented as a Wi-Fi hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control service that can control functions or provide various processing tasks of components of system 10, shown as a cloud-based backend control service system 34, which could be an Arlo SmartCloud™ system. The backend system, such as the cloud-based control service system 34 includes at least one cloud-based server 36, each of which includes at least a power supply, a system board, one or more CPUs, memory, storage, such as a sharable database, and a network interface. The at least one cloud-based server 36 typically provides, for example, cloud-base onboarding capabilities for peripheral client devices 16 as will be described in further detail below, cloud storage of data, for example events, AI (artificial intelligence) based processing such as computer vision, and system access to emergency services.

Figure 3:
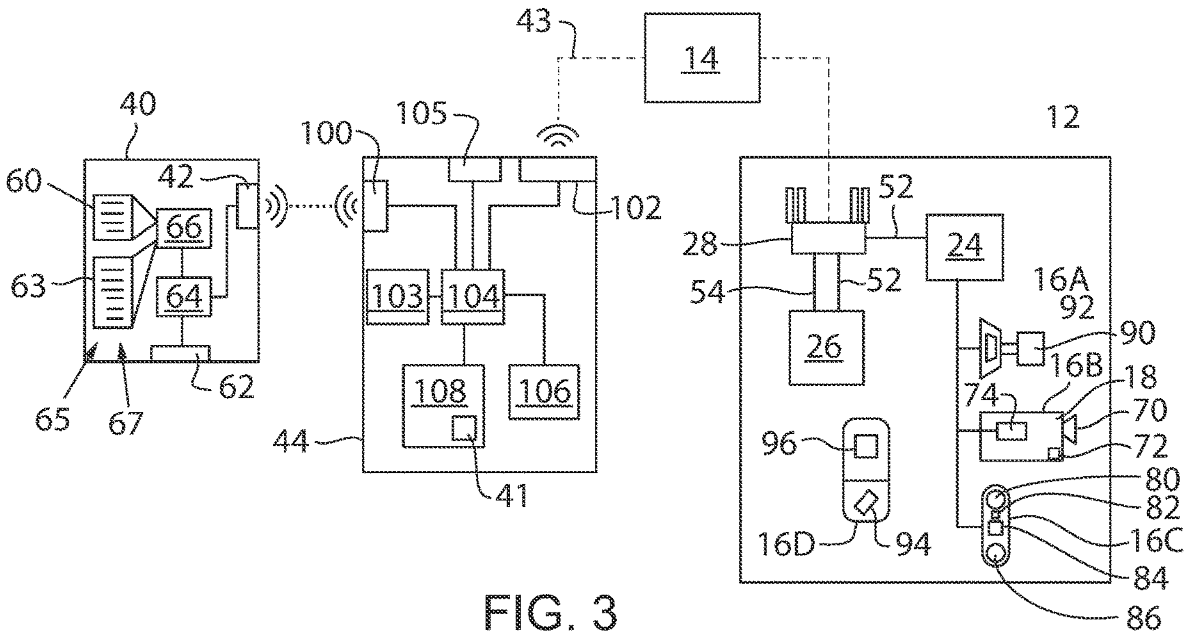
FIG. 3 is a partial block diagram representation of the system of FIG. 1.

As noted above, the client devices 16 of electronic monitoring system 10 may include one or more monitoring devices 18 that are mounted to face toward respective areas being monitored, such as around a building or other structure or area. Monitoring devices 18 may perform a variety of monitoring, sensing, and communicating functions. With reference also to FIG. 3, each monitoring device 18 may include a camera 70 and/or a microphone 72 to obtain video and/or audio data from an area being monitored. The monitoring device 18 includes firmware stored in non-volatile memory thereon and a control circuit 74 to execute the firmware. As is conventional, the firmware acts as the monitoring device's complete operating system, performing all control, monitoring and data manipulation functions. The control circuit 74 receives the feedback signals from the camera 70 and/or microphone 72 and transmits data to the base station hub 24 and/or the security hub 26. Monitoring may also be incorporated into other client devices. A doorbell 16C, for example, may include a camera 80 and/or microphone 82 included within the doorbell. The doorbell 16C includes firmware stored in non-volatile memory thereon and a control circuit 84 to execute the firmware. The control circuit 84 receives a signal from a button 86 on the doorbell as is conventional for signaling the presence of a person at the door, but the control circuit 84 also receives the feedback signals from the camera 80 and/or microphone 82 and transmits data to the base station hub 24 and/or the security hub 26.

The system 10 may also include device(s) and system(s) that perform functions other than monitoring. Such devices include smart home devices such as HVAC control systems and other components. FIG. 3 illustrates two such devices as a floodlight 16A and an electronic door lock 16D. The floodlight 16A includes a lamp 90 to illuminate a desired area and a control circuit. Firmware is stored in non-volatile memory firmware on the floodlight 16A. The control circuit 92 executes the firmware acting as the floodlight's complete operating system, performing all control, monitoring and data manipulation functions. The electronic door lock 16D includes a lock portion 94, which may be manually operated or automatically operated by a motor within the lock portion, and a control circuit 96. Firmware is stored in non-volatile memory firmware on the electronic door lock 16D. The control circuit 96 executes the firmware acting as the electronic door lock's complete operating system, performing all control, monitoring and data manipulation functions. Additional devices 16 could include one-touch type communication devices such as panic buttons and other communication buttons. One such communication device is marketed under Arlo Technologies, Inc. of Carlsbad, California under the brand name ARLO SAFE™. Although the illustrated devices 16A and 16D do not include a camera or microphone, some embodiments may include a camera and/or microphone. As such, all of the devices 16 and systems can be considered "monitoring devices" for purposes of the present discussion. Devices that communicate using LE protocols such as Bluetooth® can be considered "LE devices".

As indicated above, one monitoring device may include an imaging device, such as a video camera 70, that is configured to capture and store visual images or video of the monitored area within the environment, e.g., an Arlo® camera available from Arlo Technologies, Inc. of Carlsbad, California. In addition to containing a camera 70, the monitoring device 18 may also include one or more sensors configured to detect one or more types of conditions or stimuli, for example, motion, opening or closing events of doors or windows, the presence of smoke, carbon monoxide, water leaks, and temperature changes. Instead of, or in addition to, containing sensors, the monitoring device 18 may have audio device(s) such as microphones 72, sound sensors, and speakers configured for audio communication or providing audible alerts. Other types of monitoring devices 18 may have some combination of sensors 20 and/or audio devices without having imaging capability. One such device is Arlo Chime™ which has only audio capabilities. Sensors 20 or other monitoring devices 18 also may be incorporated into form factors of other house or building accessories, such as doorbells 16C, floodlights 16A, etc.

In order to allow for low and high frequency communication on WLAN 12, it is contemplated for monitoring devices 18 to have two radios operating at different frequencies. A first, "primary" radio operates at a first frequency, typically at a relatively high frequency, typically of 2.4 GHz to 5 GHZ, during periods of normal conductivity to perform monitoring and data capture functions such as video capture and transmission, sound transmission, motion sensing, etc. The second or "secondary radio" operates at a second frequency that is immune to, or at least resistant to, signals that typically jam other signals over the first frequency. The second frequency may be of considerably lower frequency in the sub-GHz or even RF range and may have a longer range than the primary radio. It is intended for the secondary radio to be operable when communications over the primary communication path are disrupted in order to permit the continued operation of monitoring devices 18, as well as to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 35 designated for wireless communication. As is known, module 35 allows monitoring devices 18 to communicate directly with one or more user devices 44 over a wireless Personal Area Network (PAN) via one or more PAN communication protocols such as Bluetooth®, Zigbee®, Z-Wave™, and MQTT™. Likewise, sensors 20 may similarly include Bluetooth® or any PAN communications module 45 to allow sensor 20 to communicate directly with one or more user devices 44 over a wireless Personal Area Network (PAN) 38 using one or more PAN communication protocols.

Figure 2:
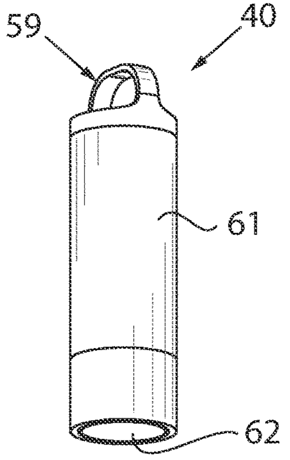
FIG. 2 is a perspective view of an exemplary communication device for the system of FIG. 1.

One or more of the client devices 16 may take the form of low energy (LE) communication devices which utilize Bluetooth® or other PAN communications protocols to communicate. For example, an LE device may take the form of a single touch communication device, such as a panic button and other communication button, generally designated in FIG. 1 by the reference number 40. One embodiment of the communication device 40 is further illustrated in FIG. 2. With reference to FIGS. 2 and 3, the illustrated communication device 40 includes a housing 61 with an actuator 62 that may be selectively engaged by a user of the communication device 40. The illustrated actuator 62 is a push-button that may be depressed to generate a signal provided to a control circuit in the communication device 40. The control circuit 64 may include a processor in communication with memory 66 to execute a series of instructions stored in the memory. The memory 66 includes non-volatile memory and may also include volatile memory. The series of instructions may be defined as a firmware image stored in the non-volatile memory 66 thereon. As is conventional, the firmware image acts as the communication device's complete operating system, performing all control, monitoring and data manipulation functions. Each communication device 40 may also include a serial number 60 stored in non-volatile memory 66 providing a unique identifier for the communication device. Each communication device 40 further includes a PAN communications technology module 42 designated for wireless communication using low energy "LE" protocols. The module 42 may be a Bluetooth® module. As is known, module 42 allows the communication device 40 to communicate with various components, such as one or more user devices 44 or bridge 19 over the PAN 38, as hereinafter described.

With reference again to FIG. 1, bridges 19 are provided for an LE device, such as the communication device 40, to communicate on the WLAN 12. Similar to monitoring devices 18, bridges 19 may include two radios operating at different frequencies in order to allow for low and high frequency communication on the WLAN 12. A first, "primary" radio operates at a first frequency, typically at a relatively high frequency, typically of 2.4 GHz to 5 GHZ, during periods of normal conductivity. The second or "secondary radio" operates at a second frequency that is immune or at least resistant to signals that typically jam other signals over the first frequency. The second frequency may be of considerably lower frequency in the sub-GHz or even RF range and may have a longer range than the primary radio. It is intended for the secondary radio to be operable when communications over the primary communication path are disrupted. In addition, it is contemplated for each bridge 19 to include Bluetooth® or any PAN technology module 46 designated for wireless communication. As is known, modules 46 allow bridges 19 to communicate directly with the LE devices over PAN 38, as hereinafter described.

One or more user devices 44, such as a mobile device, smart phone, tablet, laptop, or PC, may communicate with various components of the electronic monitoring system 10. It can be understood that user devices 44 may communicate with the various components of electronic monitoring system 10 utilizing WLAN 12, WAN 14 and/or PAN 38 to provide an interface through which a user may interact with electronic monitoring system 10, including client devices 16. With reference also to FIG. 3, the user device 44 may include multiple communication modules, including a PAN communications module 100 designated for wireless communication using low energy "LE" protocols. The PAN communications module 100 may be a Bluetooth® module allowing the user device 44 to communicate with other user devices 44, the bridge 19, client devices 16 or various other components in the monitoring system 10. Furthermore, in those embodiments of the user device 44, in which the user device 44 is a mobile device, smart phone, tablet or the like, the user device may include a cellular communications module 102 configured for cellular communication. The user device 44 may communicate with the WAN 14 over a cellular communication path 43 between the user device 44 and the mobile provider 32. Accordingly, through communication with the mobile provider 32, each user device 44 may form a communication pathway with the at least one cloud-based server 36 of the cloud-based control service system 34. Alternatively, when operating within WLAN 12, the cellular equipped user device 44 may alternatively communicate with the WAN 14 via the cellular communication path 43 or the gateway router 28 in communication with the internet provider 30. Whether through the Wi-Fi connection to the gateway router 28 or its respective internet provider 30, the user device 44 is configured to form a communication pathway with the cloud-based server 36.

The user device 44 may also include a position information interface 105. The position information interface 105 is in communication with one or more external sources to obtain position information for the device. According to one aspect of the invention, the position information interface 105 is in communication with multiple local substations, such as cellular towers. Each cellular tower has knowledge of its location either via data stored at the tower or via communication with a satellite positioning service. The user device 44 determines its distance from each of the local substations and receives the location data for the local substation. Using the position data for each local substation and triangulation, the user device 44 determines its present location. According to another aspect of the invention, the user device 44 may be in direct communication with the satellite positioning service. The satellite position service may be, for example, the Global Positioning System (GPS), Galileo, or the like, and directly provide information to the user device 44 of the present location of the device.

Each user device 44 includes memory 106 with an operating system and applications stored therein. A processor 104 is provided to execute the applications and to send and receive data from the communications modules 100, 102. A clock circuit 103 is illustrated in communication with the processor 104. The clock circuit 103 maintains a real-time value of the present time. Optionally, the clock circuit 103 may be a module executing on the processor 104. Each user device 44 further includes a user interface 108. The user interface 108 may include a microphone to receive audio from a user, a speaker to playback audio for the user, a video display system that typically includes a touchscreen to both display video data to and receive input from the user. Each user device may include an application stored in memory 106 and executable by the processor 104 to interact with the system 10. One such application is the Arlo® Smart application, which is displayed on the user interface 108 and which includes at least one actuatable user input 41. In response to the information provided on the display of the one or more user devices 44, a user may actuate the at least one actuatable user input 41.

Referring to again FIG. 1, within WLAN 12, multiple communication paths 50 are defined that transmit data between the various components of system 10. Communication paths 50 include a default or primary communication path 52 providing communication between monitoring device 18 and the base station hub 24, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the peripheral device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52. Primary communication path 52 also extends between bridge 19 and the base station hub 24, and secondary communication path 54 may provide for fail-over or fallback communication between bridge 19 and the security hub 26, if the security hub 26 is present. The controllers of bridges 19 may also provide a wireless communication path directly to the router 28.

As described, electronic monitoring system 10 is configured to implement a seamless Over-The-Air (OTA) communication environment for each client device 16 by implementing a communication path switching strategy as a function of the operational state of primary and/or secondary communication paths, as heretofore described. For example, each monitoring device 18 is configured to acquire data and to transmit the acquired data, or data obtained by processing the acquired data, to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include, or be coupled to, a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling, and transmitting data received from the monitoring device 18 via the hubs 24 and 26, router 28, and server 36. Server 36 or another appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Figure 4:
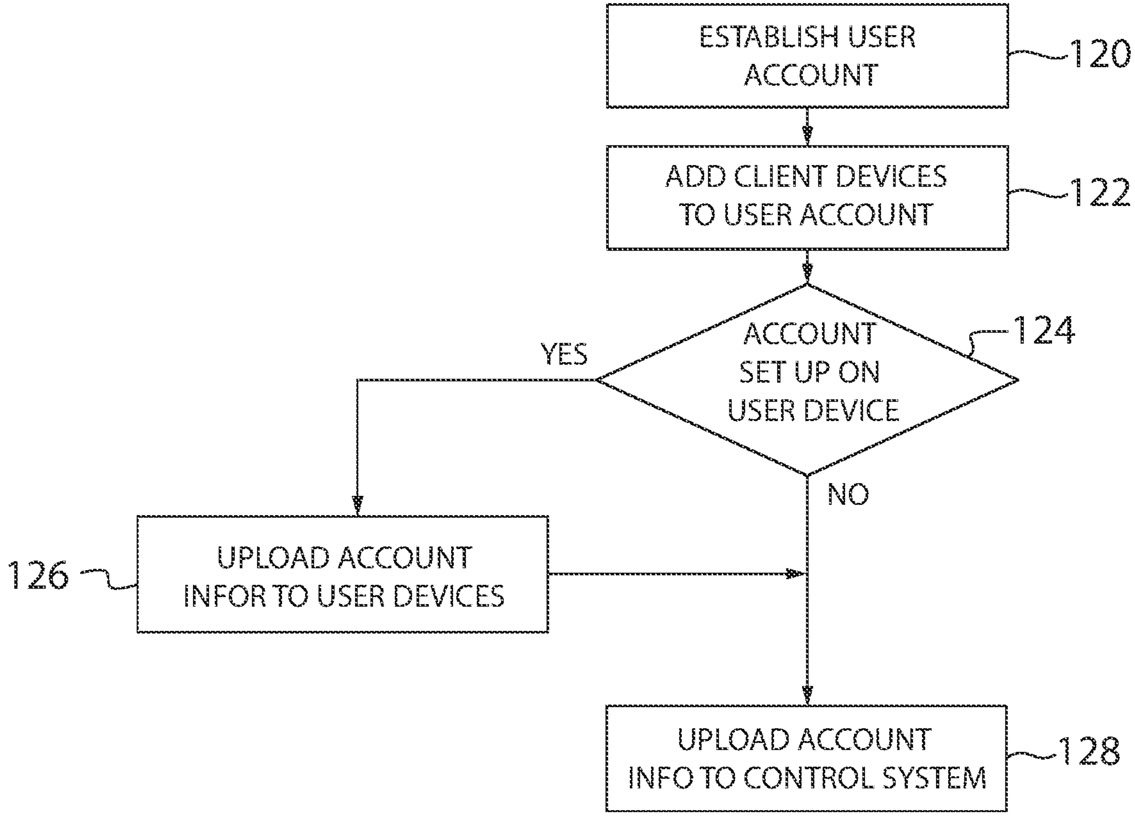
FIG. 4 is a flowchart showing a set of steps for registering a device in the system according to one embodiment of the present invention.

Referring now to the flowchart of FIG. 4, in order to set up the electronic monitoring system 10 of the present embodiment, a user establishes an account with a service provider, e.g., Arlo, through the service provider's webpage or using the service provider's software application on user device 44, as shown in step 120. At step 122, a user may add or onboard various client devices 16 to the account previously established. The various client devices 16 may be monitoring devices 18, sensors 20, and the LE devices, such as the communication device 40, to the electronic monitoring system 10 associated with the user's account by utilizing, for example, a pre-populated list of devices and simply following a series of on-screen instructions. Once the various client devices 16 are added to the user's electronic monitoring system 10 through the user's account, information regarding client devices 16, e.g. serial numbers 60, is uploaded to cloud-based control service system 34, where the information is stored in the computer-readable memory associated with cloud-based backend control service system 34, block 106, for future reference. At step 124, the backend control service system 34 checks if the account was set up on one or more user devices 44. If a user utilized the service provider's webpage to onboard a user device 44, the cloud-based control service system 34 uploads the information regarding client devices 16, e.g. serial numbers 60, to the service provider's software application on user device 44, as shown in step 126. In either case, the cloud-based control service system 34 uploads the information regarding client devices 16, e.g. serial numbers 60, to the hub(s) 24, 26 in the control system 10, as shown in step 128.

Figure 5:
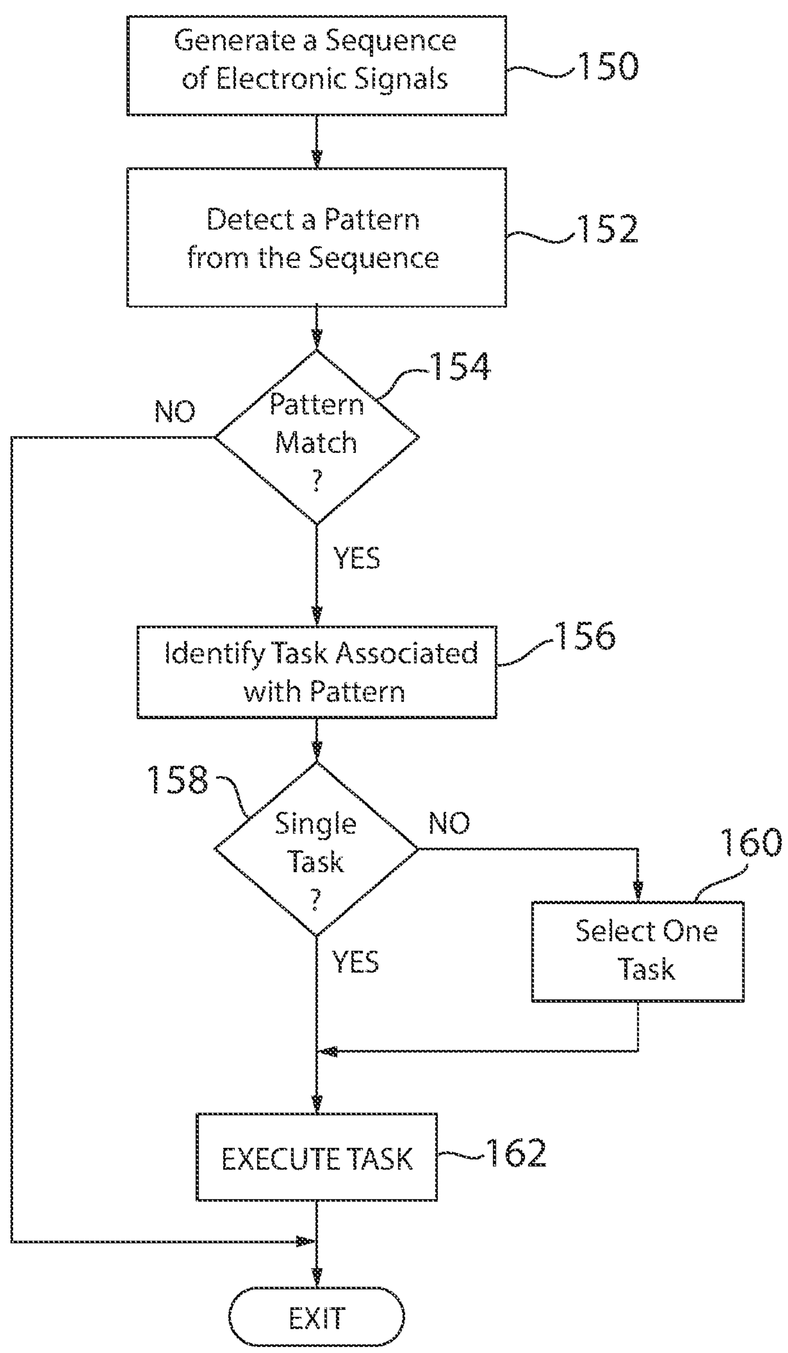
FIG. 5 is a flowchart showing a set of steps for remote activation of a task in the electronic monitoring system according to one embodiment of the invention.

In operation, the communication device 40 is configured to control one or more of the devices 16 in the electronic monitoring system 10. The communication device 40 includes the single actuator 62 which is selectively activated by a user of the device. In order to determine a particular function that the user wishes to perform, the actuator 62 is sequentially activated multiple times for varying durations of time. With reference next to FIG. 5, an exemplary sequence of steps to control the devices 16 in the electronic monitoring system 10 is illustrated.

As shown in step 150, a sequence of electronic signals are generated. The actuator 62 is configured to generate an electronic signal each time the actuator 62 is activated. The actuator 62 may be a normally open device meaning a signal output from the actuator 62 is "off" or is at a logical "zero" state when the actuator 62 is not activated. The normally open device generates a signal that is "on" or at a logical "one" state when the actuator 62 is activated. Alternately, the actuator 62 may be a normally closed device meaning a signal output from the actuator 62 is "on" or is at a logical "one" state when the actuator 62 is not activated. The normally closed device generates a signal that is "off" or at a logical "zero" state when the actuator 62 is activated. With reference again to FIG. 2, the illustrated actuator 62 is a push-button. Therefore, the actuator 62 transitions between states when the button is pressed and again when the button is released. A user sequentially presses the button to generate the sequence of signals transitioning between states.

As further shown in FIG. 2, the portable button includes a loop 59 at one end of the housing 61 and the button actuator 62 at the other end of the housing. The loop 59 allows the device to be clipped to a bag, a backpack, a belt-loop, or other similar locations to make the communication device 40 readily available to a user. According to one aspect of the invention, the communication device 40 is in communication with a user device 44 via the PAN 38. The user device 44 may be a mobile phone or tablet which is connected to the base station hub 24, security hub 26, or a combination thereof via the cellular communication path 43. The user device 44 may be in the bag or backpack or in a pocket and not readily available to the user. However, the user may selectively engage the button 62 to generate multiple patterns of signals and transmit the signals to the user device 44 and/or the hubs 24, 26 to control the devices 16 in the electronic monitoring system 10. When the button 62 is pressed for a first time in a sequence, the communication device 40 may transmit a wake message to the user device 44. The wake message may active an application on the user device 44, such as an application marketed under Arlo Technologies, Inc. of Carlsbad, California under the brand name ARLO SAFE™. With the application active, the user device 44 is ready to communicate via the PAN 38 with the communication device 40.

At step 152, a pattern is detected from the sequence. According to one aspect of the invention, the communication device 40 may be configured to transmit the electronic signals generated by the actuator 62 directly without any further processing. The communication device 40 may pass the electronic signal via the PAN 38 to a controller in communication with the communication device 40. The controller, in turn, detects the pattern from the electronic signals generated by the actuator 62. The controller may be the control circuit 64 in the user device 44 or a controller in one of the hubs 24, 26. According to another aspect of the invention, the control circuit 64 in the communication device 40 may perform some initial processing of the signal generated by the actuator 62. The control circuit 64 may determine whether the signal generated by the actuator 62 corresponds to a short duration signal or a long duration signal and transmit a sequence of short and long duration signals. The control circuit 64 may further detect the pattern generated by the sequence of short and long duration signals. As illustrated in FIG. 3, the memory 66 of the communication device may store a lookup table 63 with a column of identifiers 65 and a column of patterns 67. After detecting a pattern of short and long duration signals, the control circuit 64 compares the detected pattern to the column of patterns 67 to identify a matching pattern. The identifier 65 corresponding to the matching pattern 67 is read from the lookup table 63 and the identifier 65 may be inserted into data transmitted to the user device 44 and/or to the hubs 24, 26 for the electronic monitoring system 10.

Whether the communication device 40, user device 44, or hub 24, 26 is used to detect the pattern, the controller for the device detecting the pattern monitors the electronic signal generated by the actuator 62 to detect when the actuator 62 is pressed. The controller monitors a duration for which the actuator 62 is engaged to determine whether the actuation corresponds to a short duration signal, S, or a long duration signal, L. For example, a signal lasting less than one second may correspond to a short duration signal and a signal lasting more than one second may correspond to a long duration signal. The duration used as the threshold to determine a short or long duration signal may be configurable and stored as a parameter in the corresponding memory for the device. The pattern may include one or more short duration signals, S, and one or more long duration signals, L. The pattern may be of varying numbers of S and L signals and of varying overall length. For example, a first pattern may consist of S-S-L-L-S, and a second pattern may consist of L-L-S-L. The controller continues monitoring the signal generated by the actuator 62 and adding either short duration signals or long duration signals to the pattern until the actuator 62 remains in an off state for a predefined duration. When the actuator 62 remains in an off state for the predefined duration, the pattern is considered complete and the controller attempts to match the pattern to a stored pattern.

At step 154, the controller determines whether a pattern generated by the actuator 62 matches a pattern stored in memory. If no pattern matches, the controller ignores the pattern and takes no further action. If the pattern generated by the actuator 62 matches a pattern stored in memory, then the controller moves to step 156 to identify a task to perform within the electronic monitoring system 10. As previously discussed, a lookup table 63 may be provided which associates each pattern 67 with an identifier 65. The lookup table 63 in FIG. 3 is shown in the communication device 40. A similar lookup table may be stored in memory 106 of the user device 44 or in memory of the hub 24, 26 which is being used to identify a task to be performed. A user may associate a task to be performed by the electronic monitoring system 10 with each identifier. The task may be included as an additional column in the lookup table or a separate lookup table may associate each identifier 65 with the task to perform. The identifiers 65 may be sequential numbers, such as 1, 2, 3, . . . , or sequential letters, such as A, B, C, . . . . The electronic monitoring system 10 may include tasks such as turn on/off floodlight 16A, display/record video from camera 16B, send audio to microphone 82 in doorbell, 16C, lock/unlock electronic door lock 16D, and the like. Different patterns of short duration signals, S, and long duration signals, L, initiate the tasks, allowing a single actuator 62 to perform multiple tasks in the electronic monitoring system 10.

At step 158, the controller further determines whether a single task has been assigned to a particular sequence of signals. If the controller identifies just a single task associated with the detected pattern, the task is executed, as shown in step 162. Some patterns may, however, have multiple tasks associated with the pattern and the controller must determine which of the tasks to perform, as indicated in step 160. According to one aspect of the invention, the lookup table 63 may include two task identifiers 65 associated with a single pattern. The controller requires a second input to determine which of the two tasks to perform. Alternately, the lookup table 63 may include a single identifier associated with each pattern. A particular task, however, may still require a second input to further identifier which task is to be performed.

According to one aspect of the invention, the second input may be the present time. The controller determining which task to perform may determine the current time. If, for example, the user device 44 is determining which task to perform, the control circuit 104 reads the current time from the clock circuit 103. A single pattern may be provided to control the floodlight 16A. If, however, the current time is past a predefined time in the evening, when the pattern to control the floodlight 16A is received, the user device 44 sends a command to one or both of the hubs 24, 26 to turn on the floodlight 16A. If the current time is past a predefined time in the morning, when the pattern to control the floodlight 16A is received, the user device 44 sends a command to one or both of the hubs 24, 26 to turn off the floodlight 16A.

According to another aspect of the invention, the second input may be a location. The communication device 40 is configured to communicate with either a user device 44 or one of the hubs 24, 26 via the PAN 38. The user device 44 obtains position information from the position information interface 105. In the United States, the position information interface 105 is commonly connected to the Global Positioning System (GPS). Similarly, a hub 24, 26 may be connected to the GPS to obtain position information. When the communication device 40 generates a pattern which requires position information, the user device 44 or the hub 24, 26 obtains the current position of the corresponding device and associates the position information with the communication device 40. Because the communication device 40 connects to another device via the PAN 38, the communication device is typically within a few feet of the user device 44 or hub 24, 26 with which it is communicating. The user device 44 may then issue a command to the hub 24, 26 as a function of both the pattern detected and the present location obtained for the user device 44.

The controller determining which task to perform may determine the current location. If, for example, the user device 44 is determining which task to perform, the user device 44 first obtains the position information. When the user device 44 and the associated communication device 40 are within a predefined distance from the hub 24, 26, indicating the user is present at the building in which the electronic monitoring system is located, and a pattern is received from the communication device 40 to control an alarm, the user device 44 commands the hub 24, 26 to deactivate the alarm. When the user device 44 and the associated communication device 40 are outside of the predefined distance from the hub 24, 26, indicating the user is away from the building in which the electronic monitoring system is located, and the pattern is received from the communication device 40 to control the alarm, the user device 44 commands the hub 24, 26 to activate the alarm.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. An electronic monitoring system, comprising:

a communication device, further comprising:

an actuator which generates a signal when the actuator is selectively engaged, and a transmitter to transmit data corresponding to the signal when the actuator is selectively engaged; and a receiver in communication with the transmitter to receive the data from the transmitter;

a hub;

a plurality of devices in communication with the hub; and a controller in communication with the receiver to receive the data from the receiver, the controller is operative to:

detect at least one short duration signal and at least one long duration signal from the data, wherein the at least one short duration signal is active for a time less than a predefined duration stored in a memory in communication with the controller and the at least one long duration signal is active for a time greater than the predefined duration;

detect a pattern from the at least one short duration signal and the at least one long duration signal; and execute a task in the electronic monitoring system, selected from a plurality of tasks, as a function of the pattern detected, wherein the task controls operation of at least one of the plurality of devices.

2. The electronic monitoring system of claim 1, wherein the receiver and the controller are located in the hub.

3. The electronic monitoring system of claim 1, wherein the communication device further comprises a control circuit connected to the actuator to receive the signal from the actuator, wherein:

the control circuit monitors a duration of the signal each time the actuator is selectively engaged, the control circuit identifies whether the duration of the signal during each selective engagement is a short duration signal or a long duration signal, and the control circuit inserts a sequence of short duration signals and long duration signals into the data for the transmitter.

4. The electronic monitoring system of claim 1, further comprising a mobile device wherein:

the receiver and the controller are in the mobile device;

the mobile device is in communication with the hub;

the task executed by the mobile device is transmitting the pattern to the hub; and the hub controls operation of at least one of the plurality of devices responsive to receiving the pattern.

5. The electronic monitoring system of claim 4, wherein the mobile device is in communication with the communication device via a personal area network and the mobile device is in communication with the hub via a wide area network.

6. The electronic monitoring system of claim 5, wherein the mobile device includes global positioning data and the mobile device transmits the global positioning data along with the pattern to the hub.

7. The electronic monitoring system of claim 1, further comprising a mobile device wherein:

the mobile device includes positioning data corresponding to a present location of the mobile device;

the receiver and the controller are in the mobile device;

the mobile device executes a first task when the present location of the mobile device is in a first range of positions; and the mobile device executes a second task when the present location of the mobile device is in a second range of positions.

8. The electronic monitoring system of claim 1, further comprising a mobile device wherein:

the mobile device includes positioning data corresponding to a present location of the mobile device;
the receiver and the controller are in the mobile device;
the mobile device transmits the present location of the mobile device and the pattern to the hub;
the hub executes a first task when the present location of the mobile device is in a first range of positions; and
the hub executes a second task when the present location of the mobile device is in a second range of positions.

9. The electronic monitoring system of claim 1, further comprising a clock circuit configured to generate a present time, wherein the controller is further operative to execute a first task when the present time is in a first range of times and the controller is further operative to execute a second task when the present time is in a second range of times.

10. The electronic monitoring system of claim 1, wherein:
the communication device further comprises a control circuit configured to:
detect at least one short duration signal and at least one long duration signal from the data,
detect a pattern from the at least one short duration signal and the at least one long duration signal, and
read an identifier for the pattern from a look up table stored in memory on the communication device;
the data transmitted from the communication device to the controller is the identifier; and
the controller is operative to detect the pattern from the identifier received from the communication device.

11. A method of initiating a task in an electronic monitoring system, comprising the steps of:
generating a signal with a communication device responsive to an actuator on the communication device being selectively engaged;
receiving data from the communication device at a controller, wherein the data corresponds to the signal;
detecting at least one short duration signal and at least one long duration signal from the data, wherein the at least one short duration signal is active for a time less than a predefined duration stored in a memory in communication with the controller and the at least one long duration signal is active for a time greater than the predefined duration;
detecting a pattern from the at least one short duration signal and the at least one long duration signal; and
executing a task in the electronic monitoring system, selected from a plurality of tasks, as a function of the pattern detected, wherein the controller is located in a hub for the electronic monitoring system and wherein the step of executing the task in the electronic monitoring system further comprises the step of controlling operation of at least one of a plurality of devices in communication with the hub responsive to receiving the data from the communication device.

12. The method of claim 11, further comprising the steps of:
monitoring a duration of the signal with a control circuit in the communication device each time the actuator is selectively engaged,
identifying whether the duration of the signal during each selective engagement is a short duration signal or a long duration signal with the control circuit in the communication device, and
inserting a sequence of short duration signals and long duration signals into the data transmitted to the controller with the control circuit in the communication device.

13. The method of claim 11, further comprising the steps of:
receiving the data from the communication device at a mobile device; and
transmitting the data from the mobile device to the controller in a hub for the electronic monitoring system, wherein the step of executing the task in the electronic monitoring system further comprises the step of controlling operation of at least one of a plurality of devices in communication with the hub responsive to receiving the data from the communication device.

14. The method of claim 11, further comprising the steps of:
receiving the data from the communication device at a mobile device via a personal area network;
determining a present location of the mobile device and the communication device as a function of position data for the mobile device; and
transmitting the data and the present location from the mobile device to the controller, wherein:
the controller executes a first task in the electronic monitoring system when the present location of the mobile device is in a first range of positions; and
the controller executes a second task in the electronic monitoring system when the present location of the mobile device is in a second range of positions.

15. The method of claim 11, further comprising the steps of:
reading a present time from a clock circuit;
executing a first task in the electronic monitoring system when the present time is in a first range of times; and
executing a second task in the electronic monitoring system when the present time is in a second range of times.

16. The method of claim 11, wherein a control circuit in the communication device is configured to detect the at least one short duration signal and the at least one long duration signal from the signal and to detect the pattern from the at least one short duration signal and the at least one long duration signal, the method further comprising the steps of:
reading an identifier for the pattern from a look up table stored in memory on the communication device;
inserting the identifier into the data transmitted from the communication device to the controller; and
executing the task in the electronic monitoring system as a function of the identifier.

17. A communication device for an electronic monitoring system, comprising:
a housing;
an actuator mounted on the housing such that the actuator is selectively engaged from external to the housing;
a control circuit mounted within the housing, wherein the control circuit is configured to:
receive a signal from the actuator when the actuator is selectively engaged,
detect at least one short duration signal and at least one long duration signal from the signal, wherein the at least one short duration signal is active for a time less than a predefined duration stored in a memory in communication with the control circuit and the at least one long duration signal is active for a time greater than the predefined duration, and
generate a data packet for transmission from the communication device via a personal area network, wherein the data packet is generated as a function of the at least one short duration signal and the at least one long duration signal; and a transmitter in communication with the control circuit to receive the data packet and to transmit the data packet via the personal area network.

18. The communication device of claim 17 wherein the control circuit is further configured to:

detect a pattern from the at least one short duration signal and the at least one long duration signal, read an identifier for the pattern from a look up table stored in memory, and insert the identifier in the data packet for transmission via the personal area network.

* * * * *